D. Y. WHEATLEY.
BALANCE AGRICULTURAL IMPLEMENT.
APPLICATION FILED SEPT. 14, 1918.

1,353,366.

Patented Sept. 21, 1920.
5 SHEETS—SHEET 1.

D. Y. WHEATLEY.
BALANCE AGRICULTURAL IMPLEMENT.
APPLICATION FILED SEPT. 14, 1918.

1,353,366. Patented Sept. 21, 1920.
5 SHEETS—SHEET 3.

INVENTOR.
D. Y. WHEATLEY
BY: 
ATTORNEY.

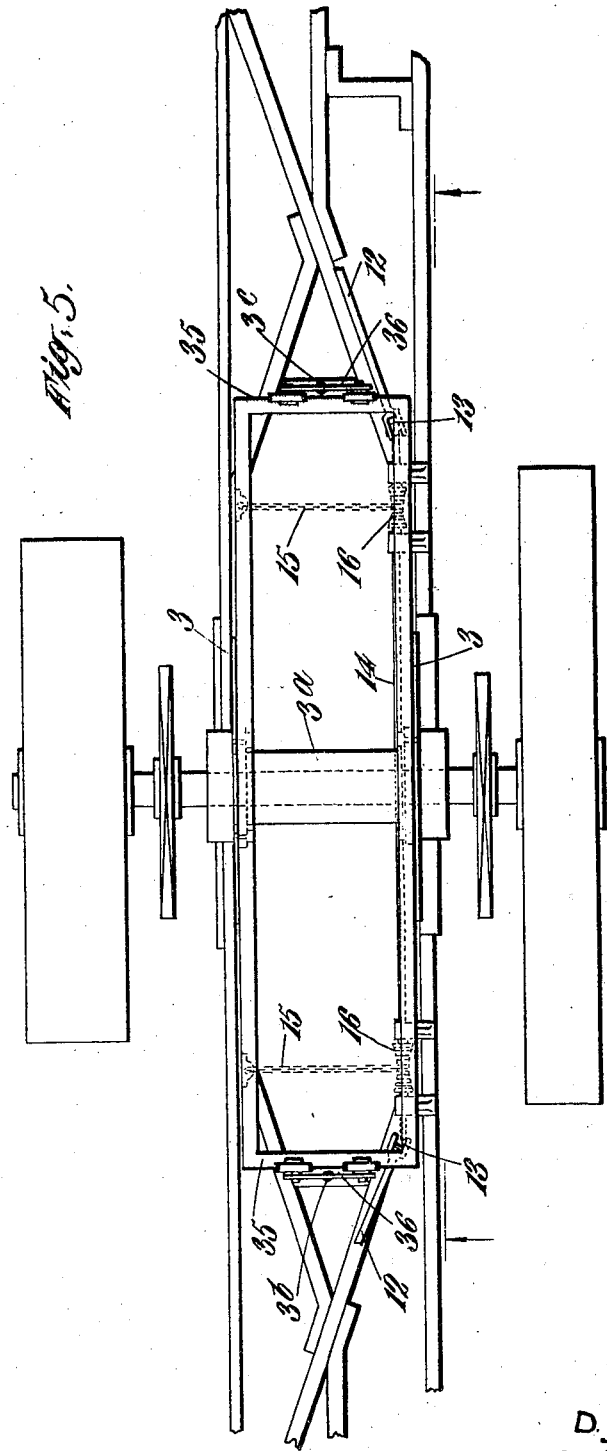

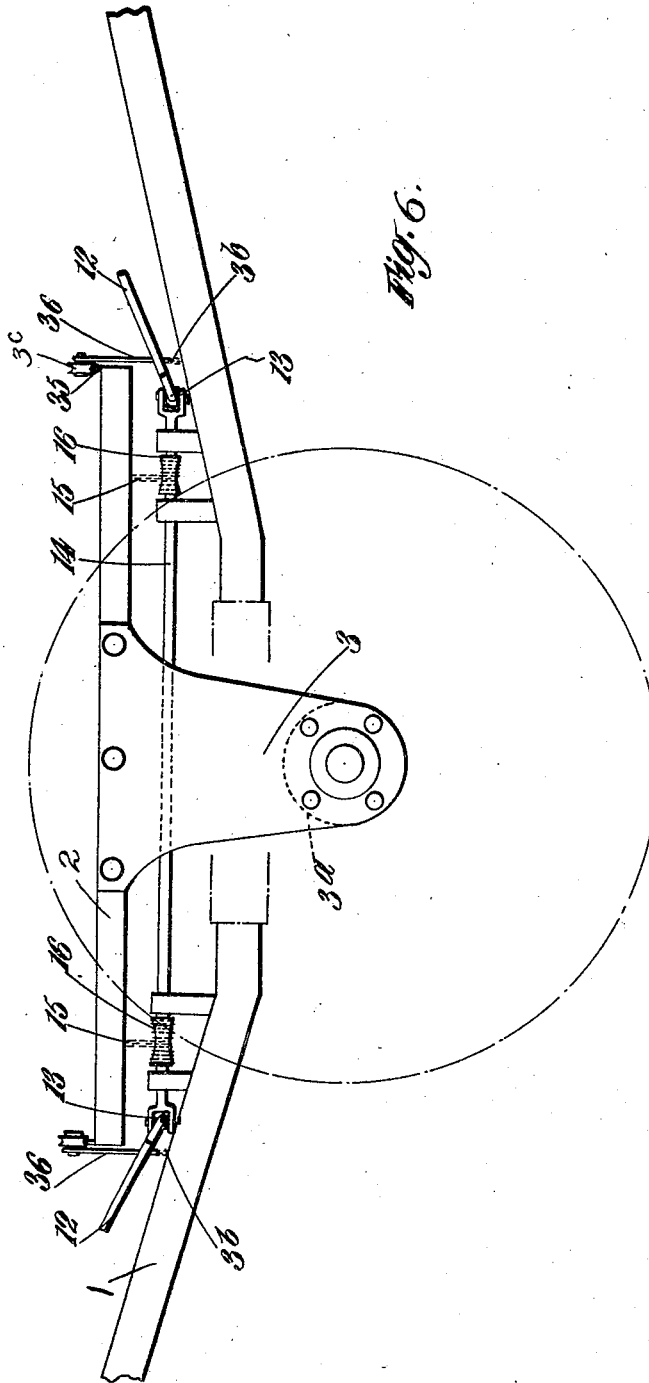

UNITED STATES PATENT OFFICE.

DANIEL YELD WHEATLEY, OF ALDINGTON, HYTHE, ENGLAND.

BALANCE AGRICULTURAL IMPLEMENT.

1,353,366.  Specification of Letters Patent.  Patented Sept. 21, 1920.

Application filed September 14, 1918. Serial No. 254,095.

*To all whom it may concern:*

Be it known that I, DANIEL YELD WHEATLEY, a citizen of the United Kingdom of Great Britain and Ireland, and resident of "Goldenhurst," Aldington, Hythe, in the county of Kent, England, have invented certain new and useful Improvements in and Relating to Balance Agricultural Implements, of which the following is a specification, such as will enable others skilled in the art to which it appertains to make and use the same.

This invention relates to self-propelled balance or one way agricultural implements in which the engine and the main wheels are mounted upon a frame which is movable in relation to the frame carrying the working tools, such for example as is described in the specification of my application for Letters Patent Serial Number 193,949.

The present invention refers more particularly to improved means of mounting the said engine-carrying frame and the land and furrow wheels, said frame being capable of some movement in relation to the main frame of the plow and being more or less of a floating type. I also prefer to provide cam means which is automatic but subject to the control of a foot lever or equivalent for raising and lowering the ends of the plow frame, said means being especially useful for traveling or transport purposes and for turning.

According to this invention the land and furrow wheels are mounted upon a shaft or axle the ends of which are each carried in bearings in a pivoted frame or open link by the movement of which steering is permitted, said steering being preferably effected in the manner hereinafter described. To this shaft or axle the chain or other coupling for pulling the implement may be attached, the attachment being substantially central, whether the implement is traveling straight or follows an indirect path occasioned by the variation in steering.

The engine, which may be of any suitable kind, is mounted upon the floating frame, and drives the axle through any suitable gear, say differential, and the drive be by one or more chains and a live axle, or by two chains running over chain wheels on a shaft and chain wheels on the traveling wheels, thus imparting motion to them from the engine.

The pivoted collars or links receive the bearings for the ends of the shaft and are movable on their pivots. As an example the collars may be in the form of oblong frames set vertically and pivoted at their lower ends one to each side of the main frame.

Steering is effected by moving the engine frame and thereby the axle and consequently the land and furrow wheels in relation to the main frame said movement being effected by any suitable gear and by steering handles or other convenient means.

I will now describe an example of my invention with reference to the accompanying drawings in which:—

Fig. 5 shows further details.

Fig. 6 illustrates how the steering can be effected.

Figure 1:
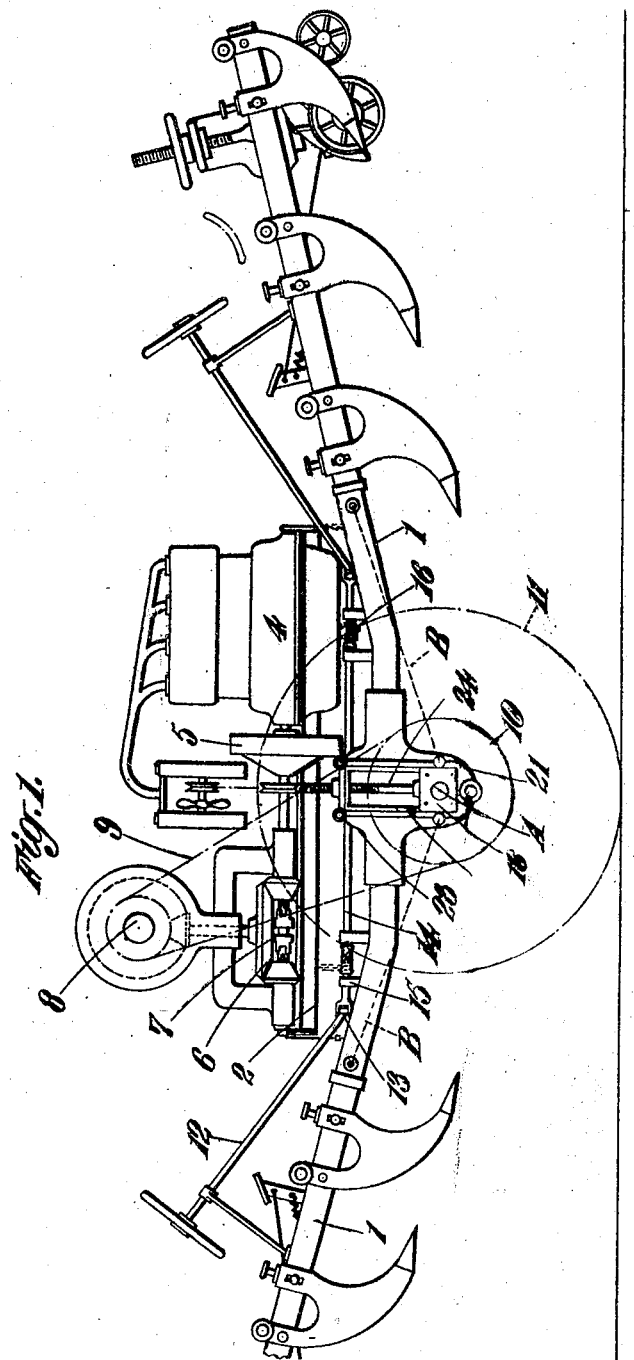
Figure 1 is a side elevation of one form of my improved plow showing the chief features of the central portion mainly.

In these drawings, the plow frame 1 supports the engine frame 2, which, secured to the side supporting plates 3, which fit over the ends of drum $3^a$ on the wheel shaft, is held in balance by chains $3^b$ and rollers $3^c$. The drive of the engine 4 is through clutch 5 conveyed to the gear 6 in which is a dog clutch 7, by which forward or reverse (to and fro) direction of travel is obtained. From the gear 6 the drive is taken to the shaft 8 and by chains 9, 9, and chain wheels 10, 10, is conveyed to the shaft of the wheels 11, 11. The shaft A is connected preferably centrally under the frame 2 to the supplemental frame 1, by any suitable cable, chain or like means, such as that shown by dotted lines and lettered B.

In this case the steering is effected by rods 12, Cardan joints 13, winding rod 14, and the chains and pulleys 15 and 16.

Figure 3:
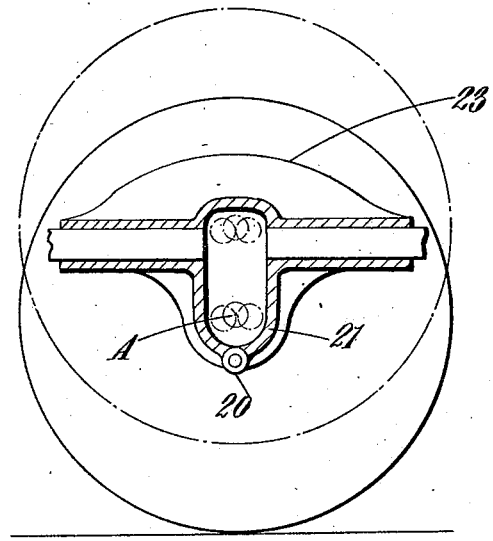
Figs. 3 and 4 show a method of mounting the pivoted side frames or links.
Figure 4:
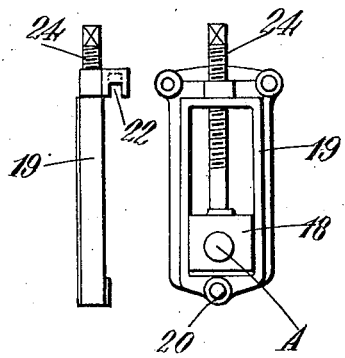

The method of carrying the wheels to permit the movement of the wheel shaft to and fro horizontally and also vertically is shown in Figs. 3 and 4.

The shaft A is mounted in a bearing 18, said bearing being slidably fitted into an open frame or link 19, pivotally mounted at 20 on a bracket 21 of the main plow frame. This open link 19 has a hooked part 22 adapted to engage the flange 23 of the main frame and a hand screw 24 is provided to raise and lower the bearing 18.

Figure 2:
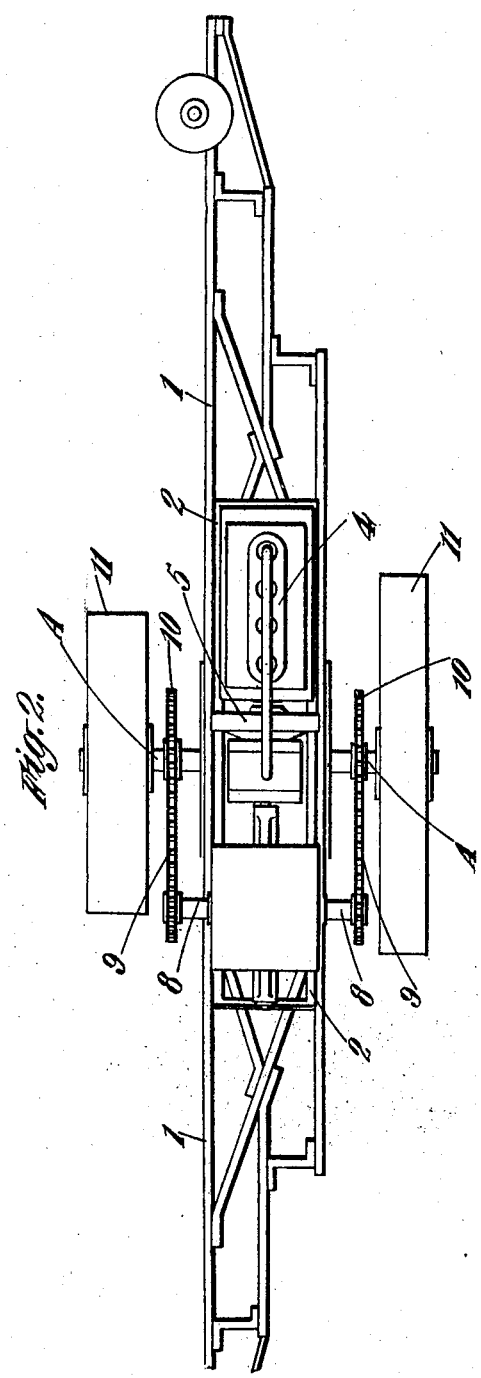
Fig. 2 is substantially a plan view of the portion shown in Fig. 1.

The construction and method of movement will be clear if the link shown in Fig. 4 is placed over the bracket shown in Fig. 3, with the pivot parts 20 coincident, and it will be clear that vertical adjustment of the screw 24 is easily made and that as the engine frame 2 (Figs. 1 and 2) may be turned by the chains 15—15 in either direction, the shaft A will take up one of a very large number of positions within the depth and the scope of movement of the open link 19, some such positions being indicated by the dotted circles in Fig. 3, and it will be seen from the above descriptions that effective and easily operated steering is obtained.

In Fig. 6 it will be seen that each end of the engine frame has a guide bar 35 on which the two rollers or pulleys 3$^c$ travel. The rollers are mounted on side plates 36 anchored by chains 3$^b$ to the plow frame 1, and will thus permit the movement of the engine frame in relation to the frame 1.

It will be evident that turning the plow at headlands is unnecessary, all that is required for the return journey being to tip the plow and reverse the drive from the engine and to steer the plow from either end.

In some constructions I may fit a pivoted frame to one side only of the main frame and may mount the axle bearing for the other side in any convenient manner. In this construction the said axle would have some lengthwise movement in its bearing on the pivoted frame side and the axle would move horizontally about a vertical pivot formed by the bearing on the other side, in which case the said bearing could be of the ball-like kind described in my specification above referred to.

As above stated, modifications can be made without departing from the spirit of the invention, and the tractor portion of the machine may be used for any convenient purpose by dismounting any parts of the frame and their fittings.

What I claim and desire to secure by Letters Patent is:—

1. A self-propelled agricultural implement comprising, in combination, a supplemental frame; an engine frame movable relatively to the supplemental frame in a substantially horizontal plane; two traveling wheels floatingly supporting the engine frame; guiding means for holding the engine frame against floating movement about a horizontal axis while permitting movement in a horizontal plane comprising transverse guide bars on the engine frame, rollers for engaging said guide bars and plates anchored to the supplemental frame for carrying said rollers; and means for moving the engine frame horizontally relatively to the supplemental frame for the purpose of steering.

2. A self-propelled agricultural implement comprising, in combination, a supplemental frame; an engine frame movable relatively to the supplemental frame in a substantially horizontal plane; two traveling wheels; bearings for the wheels; supports for the bearings pivotally mounted in the supplemental frame whereby the engine frame is floatingly supported; guiding means for holding the engine frame against floating movement about a horizontal axis while permitting movement in a horizontal plane comprising transverse guide bars on the engine frame, rollers for engaging said guide bars, and plates anchored to the supplemental frame for carrying said rollers; and means for moving said engine frame horizontally relatively to the supplemental frame for the purpose of steering.

3. A self-propelled agricultural implement comprising, in combination, a supplemental frame; an engine frame movable relatively to the supplemental frame in a substantially horizontal plane; two traveling wheels; bearings for said wheels, supports for said bearings pivotally mounted in the supplemental frame whereby the engine frame is floatingly supported; means for raising and lowering said bearings in said supports; guiding means for holding the engine frame against floating movement about a horizontal axis while permitting movement in a horizontal plane comprising transverse guide bars on the engine frame, rollers for engaging said guide bars, and plates anchored to the supplemental frame for carrying said rollers; and means for moving said engine frame horizontally relatively to the supplemental frame for steering purposes.

4. A self-propelled agricultural implement comprising, in combination, a supplemental frame; an engine frame movable relatively to the supplemental frame in a substantially horizontal plane; two traveling wheels; bearings for said wheels; supports for said bearings pivotally mounted in the supplemental frame whereby the engine frame is floatingly supported; means for raising and lowering said bearings in said supports; guiding means for holding the engine frame against floating movement about a horizontal axis while permitting movement in a horizontal plane comprising transverse guide bars on the engine frame, rollers for engaging said guide bars, and plates anchored to the supplemental frame for carrying said rollers; and means for moving said engine frame horizontally relatively to the supplemental frame for steering purposes, comprising a winding rod carried by the supplemental frame, chain pulleys secured thereto, chains on said pulleys and connected to the engine frame near each end thereof, and steering rods connected to the ends of the winding rod.

In witness whereof I have hereunto set my hand in presence of two witnesses.

DANIEL YELD WHEATLEY.

Witnesses:
 HENRY FANTROTHER,
 BARBARA BROOM.